United States Patent [19]

Takabayashi

[11] Patent Number: 4,839,574
[45] Date of Patent: Jun. 13, 1989

[54] GENERATOR SYSTEM UTILIZING A FUEL CELL

[75] Inventor: Yasuhiro Takabayashi, Kawasaki, Japan

[73] Assignee: Fuji Electric Co., Ltd., Kawasaki, Japan

[21] Appl. No.: 191,033

[22] Filed: May 6, 1988

[30] Foreign Application Priority Data

May 8, 1987 [JP] Japan .................................. 62-110634

[51] Int. Cl.⁴ .......................... H02J 7/00; H01M 8/04; H01M 10/44
[52] U.S. Cl. .......................................... 320/3; 320/24; 320/44; 429/23
[58] Field of Search ........................................ 320/2-5, 320/15, 39, 24, 44; 429/23, 9

[56] References Cited

U.S. PATENT DOCUMENTS 3,821,626  6/1974  Maver et al. ............................ 320/3
4,380,726  4/1983  Sado et al. ......................... 320/13 X
4,670,702  6/1987  Yamada et al. ....................... 320/3 X
4,677,037  6/1987  Takabayashi ...................... 429/23 X Primary Examiner—R. J. Hickey
Attorney, Agent, or Firm—Spencer & Frank

[57] ABSTRACT

In a generator system having a fuel cell and a battery to which an output current is supplied from the fuel cell, the output current from the fuel cell is controlled in response to the energy charged in the battery, so that the stable supply of the current to the load can be ensured. As the load is increased, the battery discharges to the load, so that the energy charged in the battery is decreased. In this case, the control is carried out to increase the output current from the fuel cell, so that the burden on the battery is decreased.

11 Claims, 5 Drawing Sheets

GENERATOR SYSTEM UTILIZING A FUEL CELL

BACKGROUND OF THE INVENTION

1. Field of the Invention

The present invention relates to a generator system utilizing a fuel cell and more particularly to a generator system utilizing a fuel cell of the type in which the output of the fuel cell is controlled in response to an amount of energy charged in a battery.

2. Description of the Prior Art

In general, a fuel cell cannot supply fuel to the fuel cell in response to variation in a load so that when the load to which the power is supplied from a generator system utilizing a fuel cell is a variable load, it has been considered that the fuel cell is backed up by a battery.

More particularly, when the load current is greater than the output current derived from the fuel cell, the battery delivers the additional power to the load. On the other hand, when the load current is smaller than the output current derived from the fuel cell, an excess of the power to be supplied to the load is charged into the battery.

However, when a light load continues or when the battery is charged with the output current derived from the fuel cell, there is a fear that the battery might be overcharged so that the charging condition must be monitored, thereby controlling the charging current. In case the charging current is not controlled, there arises the problem that the battery is damaged or its performance is degraded.

Furthermore, in the fuel cells, the consumption of fuel is decreased, an excessive gas is produced. In the case of a fuel cell of the type which uses a gas reformed in a reformer, a part of the reformed gas supplied to the fuel-cell electrode which does not occur a chemical reaction becomes an off-gas and burns the burner of the reformer. Therefore, because of the excessive gas supplied to the burner, the reformer is overheated so that the qualities of the reforming catalysts are degraded or the reformer itself is damaged.

In the case of the hybrid system comprising a commercially available power source and a battery, a CVCF (constant-voltage constant-frequency) control devices have been proposed and used in practice, but they are still objects to be studied including the above-described problems in the hybrid system comprising a fuel cell and a battery.

SUMMARY OF THE INVENTION

In view of the above, an object of the present invention is to provide a generator system utilizing a fuel cell which can substantially solve the above-mentioned problems so that the output delivered from a fuel cell can be controlled in response to the energy to be charged into a battery, whereby the stable power supply is ensured.

Another object of the present invention to provide a generator system utilizing a fuel cell which can ensure the stable power supply to a load which varies.

In the first aspect of the present invention, a method for controlling a generator system having the fuel cell and a battery to which the output current from the fuel cell can be supplied, comprises the steps of:

performing a first adjustment of adjusting the output current delivered from the fuel cell;

performing a second adjustment of adjusting the output current produced in the fuel cell;

storing into a memory means a predetermined relationship between the charged amount of the battery and the control signal for controlling the output current from the fuel cell;

detecting the energy stored in the battery;

looking up the predetermined relationship in relation to the detected signal representative of the energy stored in the battery to form a control signal for controlling the output current from the fuel cell; and controlling the first and second adjustment in response to the control signal, so that the output current generated by the fuel cell is increased when the energy stored in the battery is decreased.

Here, the first adjustment step may further include a step for detecting the current delivered from the fuel cell.

The current may be detected by means of a Hall current transformer.

The second adjustment step may be executed by a controller for auxiliary devices.

The controller for auxiliary devices may comprise an arithmetic unit, a pulse-width modulator and power elements.

The arithmetic unit may comprise a function generator in the form of a CPU, an operational amplifier and one or more resistors.

In the second aspect of the present invention, a generator system having a fuel cell and a battery to which the output from the fuel cell can be supplied, comprises:

a first adjustment means for adjusting the output current delivered from the fuel cell;

a second adjustment means for adjusting the output current generated in the fuel cell;

memory means for storing therein a predetermined relationship between the energy stored in the battery and a control signal for controlling the output current from the fuel cell;

a detector means for detecting the amount of energy stored in the battery;

means for looking up the predetermined relationship in relation to the detection signal representative of the energy stored in the battery to form a control signal for controlling the output current from the fuel cell; and a control means for controlling the first and second adjustment means in response to the control signal so that the output current delivered from the fuel cell is increased when the energy stored in the battery is decreased.

Here, the second adjustment means may adjust the volume of air discharged from an air blower for combustion for supplying air for combustion to the fuel cell, and may be composed of a controller for auxiliary devices.

The controller for auxiliary devices may comprise an arithmetic unit, a pulse-width modulator and power elements.

The arithmetic unit may comprise a function generator in the form of a CPU, an operational amplifier and one or more resistors.

The present invention has the construction just described above so that the output from the fuel cell can be controlled in response to the energy stored in the battery. Furthermore, by controlling the output of the fuel cell, the stable output supply to a load can be ensured. In addition, when the battery discharges to the load as the load is increased so that the energy stored in the battery is decreased, the output from the fuel cell is so controlled as to be increased, whereby the load of the battery can be decreased.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
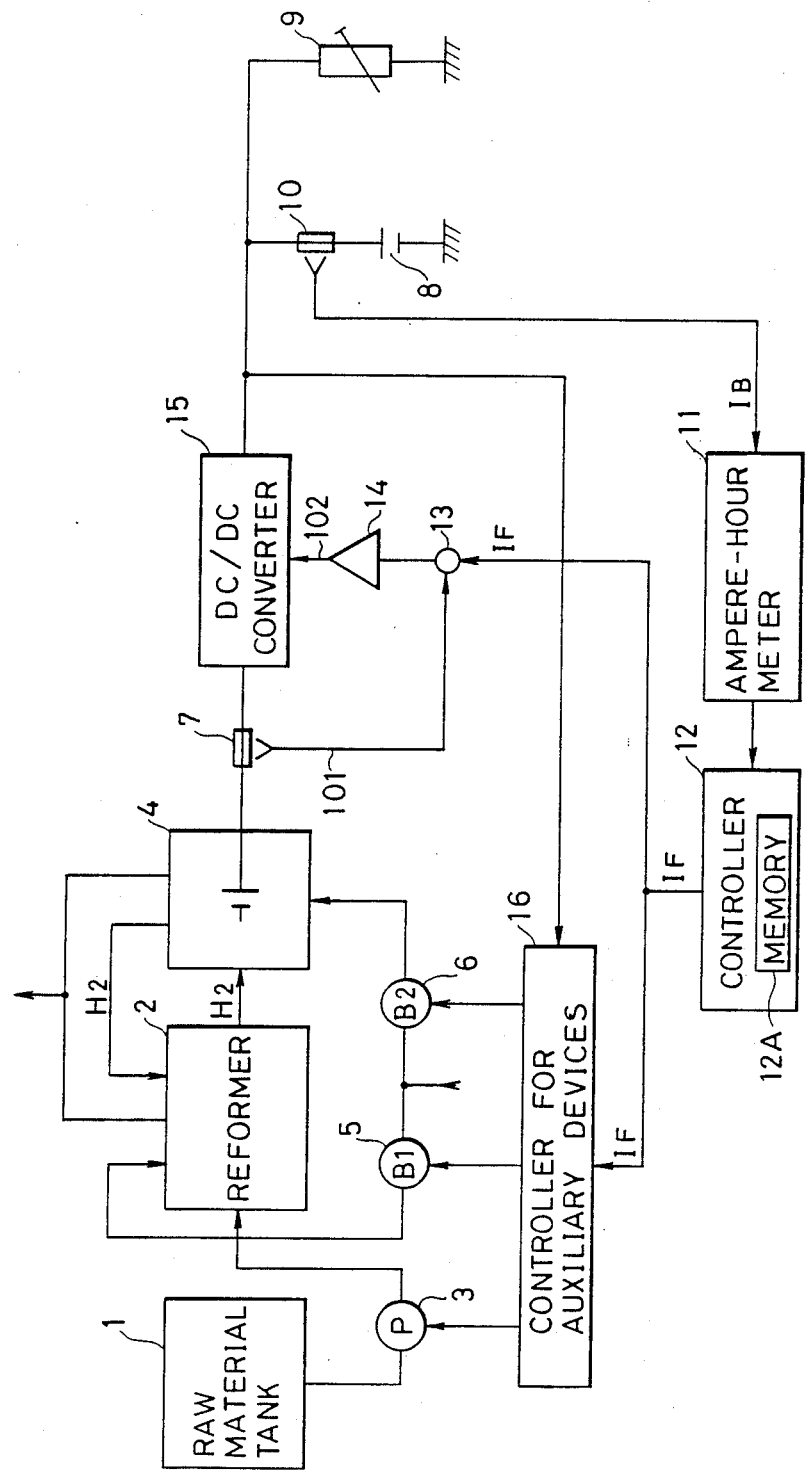
FIG. 1 is a block diagram showing a preferred embodiment of a generator system utilizing a fuel cell in accordance with the present invention.

FIG. 1 is a block diagram of one embodiment of a generator system utilizing a fuel cell in accordance with the present invention. In FIG. 1, reference numeral 1 designates a raw material tank for storing therein, for instance, methanol. Reference numeral 2 denotes a reformer for reforming the raw material supplied from the raw material tank 1 through a feed pump for feeding raw material 3 into the reformed hydrogen has $H_2$ which is fuel.

The reformed gas produced by the reformer 2 is supplied to a fuel electrode (not shown) of a fuel cell 4. Reference numeral 5 represents an air blower for combustion for supplying air required amount for the reforming reaction to the reformer 2. Reference numeral 6 denotes an air blower for reaction for supplying air to an air electrode (not shown) of the fuel cell 4.

Reference numeral 7 denotes an FC current (fuel-cell current) detector for detecting the electric current supplied from the fuel cell 4 to the battery 8 and a load 9. Reference numeral 10 denotes a detector for detecting the DC current flowing into the battery 8, thereby detecting the charging and discharging currents of the battery 8, the detector being general composed of a shunt but may be composed of a Hall current transformer which is used in the embodiment shown in FIG. 1. Reference numeral 11 denotes an ampere-hour meter for calculating the charging or discharging current into or from the battery 8 detected by the battery current detector 10. Reference numeral 12 denotes a controller in the form of a microprocessor. The FC current command signal $I_F$ delivered from the controller 12 is compared with the signal 101 derived from the FC current detector 7 by a comparator 13. The output signal from the comparator 13 is applied as the control signal 102 to a DC/DC converter 15 through an FC current regulator 14 in the form of an amplifier. The DC/DC converter 15 is interconnected between the fuel cell 4 on the one hand and the battery 8 and the load 9 on the other hand, and adjusts the output current to be supplied from the fuel cell 4 to the battery 8 and the load 9 in response to the control signal 102.

The command signal $I_F$ delivered from the controller 12 is applied to a controller for auxiliary devices 16 which is composed of, for instance, a microprocessor. In response to the command signal $I_F$, the feed pump 3, the air blower for combustion 5 and the air blower for reaction 6 are controlled by the controller for auxiliary devices 16 so that the output current generated by the fuel cell 4 itself is controlled.

Figure 2:
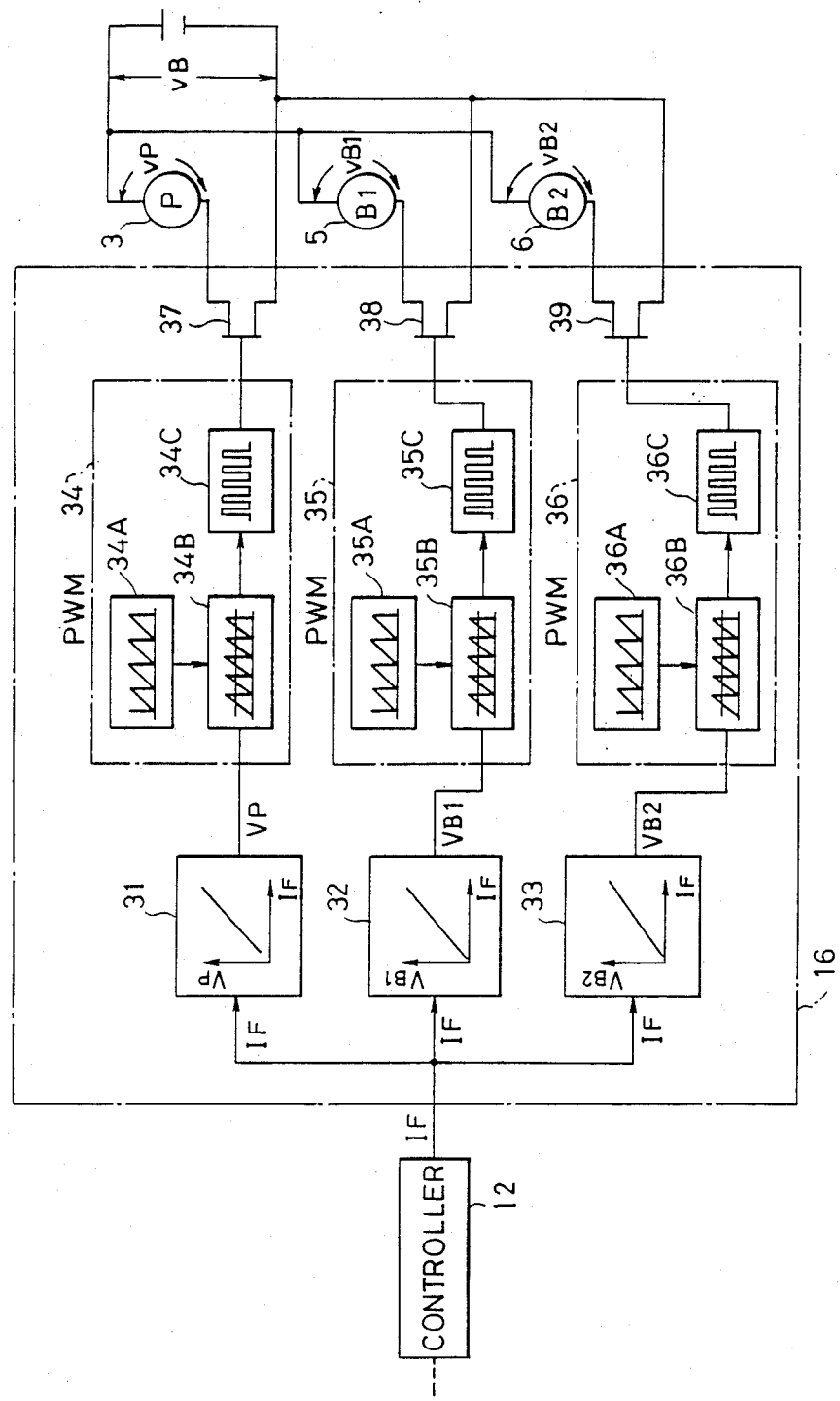
FIG. 2 is a block diagram showing an embodiment of the controller for auxiliary devices thereof.
Figure 3:
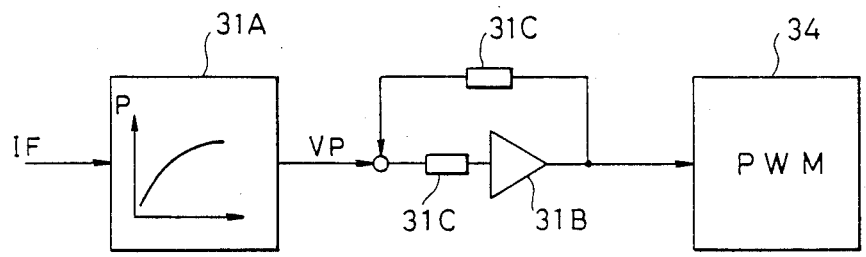
FIG. 3 is a block diagram showing an embodiment of the arithmetic unit thereof.
Figure 4:
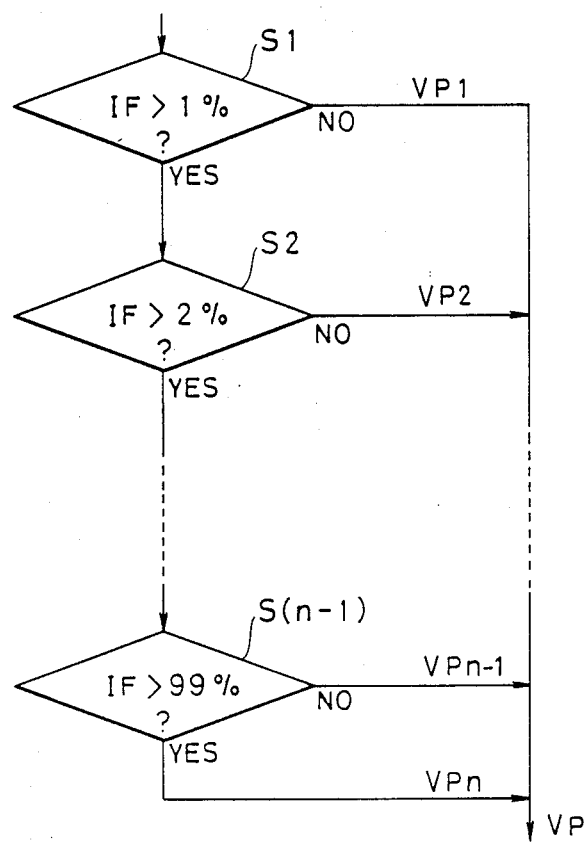
FIG. 4 is a flowchart illustrating an example of a control procedure performed by the arithmetic unit.

FIG. 2 is a block diagram of the controller for auxiliary devices 16. In FIG. 2, reference numerals 31, 32 and 33 represent arithmetic units, respcetively, which carry out the calculations in order to control the feed pump 3, the air blower for combustion 5 and the air blower for reaction 6, respectively. FIG. 3 is a block diagram of the arithmetic unit 31 and FIG. 4 shows the control procedure carried out by the arithmetic unit 31.

In FIG. 3, reference numeral 31A denotes a function generator in the form of a CPU (Central Processing Unit); 31B, an operational amplifier; and 32C, a resistor. The arithmetic unit 31 is so designed and constructed that the function generator 31A generates a desired function $V_P$ in response to the value of the $I_F$ delivered from the controller 12.

The mode of operation of the arithmetic unit 31 will be described with reference to the flowchart shown in FIG. 4. In the first step S1, it is detected whether or not the value of the $I_F$ derived from the controller 12 is in excess of 1% and when the detected current is 1% or less, a voltage signal $V_P(=V_{P1})$ is delivered to a pulse-width modulator 34 (FIG. 2). However, when the value of the $I_F$ is in excess of 1%, the operation proceeds to the next step S2 in order to detect whether or not the value of the $I_F$ is in excess of 2%. In like manner, the value of the $I_F$ is sequentially detected until the last step S (n−1). The detected voltage signals $V_P$ are applied to the pulse-width modulator 34.

So far the case of obtaining the voltage signal $V_P$ for energizing the feed pump 3 has been described, the voltage signal $V_{B1}$ for energizing the air blower for combustion 5 and the voltage signal $V_{B2}$ for energizing the air blower for reaction 6 are obtained in a manner substantially similar to that described above.

The voltages $V_P$, $V_{B1}$ and $V_{B2}$ are not linearly in proportion to the value of the current $I_F$ and they can be calculated by the CPU 31A as $V_P = f_1 \cdot I_F$, $V_{B1} = f_2 \cdot I_F$ and $V_{B2} = f_3 \cdot I_F$.

In FIG. 2, reference numerals 34, 35 and 36 designate pulse-width modulators, respectively, each comprising an oscillator 34A (35A, 36A) for generating the saw-tooth-waveform signal, a comparator 34B (35B, 36B) and a pulse generator 34C (35C, 36C). The comparator 34B (35B, 36B) is adapted to deliver the comparison output signal when the level of the saw-tooth-waveform signal is in excess of the voltage signal delivered from the arithmetic unit 31, (32, 33). Each of the pulse generators 34C, 35C and 36C generates a rectangular pulse in response to the output from its corresponding comparator.

Reference numerals 37, 38 and 39 represent high-power bipolar transistors or power elements in the form of a power MOS FET and are drive in response to the output pulses derived from the pulse generators 34C, 35C and 36C.

The voltage signals $V_P$, $V_{B1}$ and $V_{B2}$ derived from the arithmetic units 31, 32 and 33, respectively, are applied to the comparators 34B, 35B and 36B, respectively. The pulse width derived from each of the pulse generators 34C, 35C and 36C is determined in response to the level of each corresponding voltage signal. The pulses generated by the pulse generators 34C, 35C and 36C are applied as the PWM signals to the corresponding power elements 37, 38 and 39, respectively. The frequency of the saw-tooth-waveform signal derived from each oscillator becomes a switching frequency of each corresponding power element 37 (38, 39).

The pulse generated by the pulse generators 34C, 35C and 36C have a narrow pulse duration when the output power delivered from the fuel cell 4 is low; that is, when the value of the current $I_F$ is low, so that the time interval when the power elements 37, 38 and 39 are been on is short. As a result, the rotational speeds of the motors (not shown) for driving the feed pump 3, the air blower for combustion 5 and the air blower for reaction 6 become slower so that it suffices to supply the raw material and air in small amounts. On the other hand, when the output power delivered from the fuel cell 4 is high, the pulses generated by the pulse generators 34C, 35C and 36C are increased in pulse duration so that the amounts of the raw material and air to be supplied are increased.

Therefore, because of the switching operations by the power elements in response to the PWM signals delivered from the pulse-width modulators 34, 35 and 36, the voltage $V_P$, $V_{B1}$ and $V_{B2}$ applied to the driving motors for driving the feed pump 3, the air blower for combustion 5 and the air blower for reaction 6 are varied so that it becomes possible to control the feed pump 3, the air blower for combustion 5 and the air blower for reaction 6.

So far it has been described that in response to the detection of the current stored in the battery 8, the amount of the charging current supplied to the battery 8 is detected, but it is to be understood that the present invention is not limited the above-mentioned method. For instance, the stored energy can be detected by detecting the voltage between the terminals of the battery 8 by using a suitable voltage detector.

Figure 5:
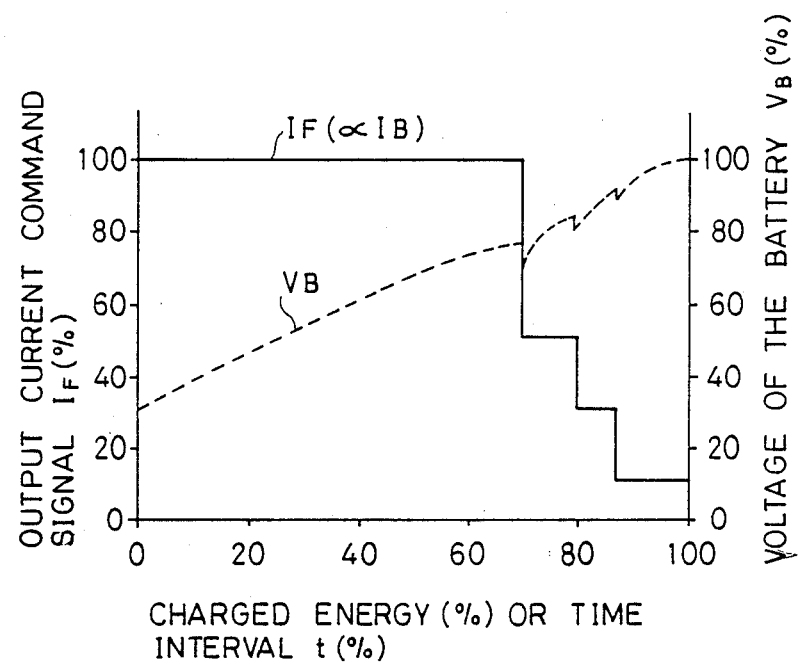
FIG. 5 is a graph illustrating an example of a pattern of a battery charging control characteristic in the present invention.

For instance, as shown in FIG. 5, the pattern of the battery charging control characteristic is stored in the memory 12A of the controller 12 so that in response to this pattern the command signal $I_F$ is generated.

In FIG. 5, the charged energy (%) representing the energy stored in the battery 8 or the time interval t(%) representing the rate of the time interval required for charging the battery 8 is plotted along the abscissa while the output current command (%) of the fuel cell 4 and the voltage between the terminals of the battery 8 are plotted along the ordinate.

Referring still to FIG. 5, the step-wise line $I_F$ indicates the output current command signal $I_F$ to be applied to the fuel cell 4 and is in proportion to the current $I_B$ flowed to the battery 8. The curve $V_B$ represents the voltage $V_B$ of the battery 8.

When the voltage $V_B$ is 70% or less, the controller 12 delivers the command signal $I_F$ so that the output of the fuel cell 8 reaches 100%. In like manner, the controller 12 detects a variety of the charged capacities 70-80%, 80-85% and 85-100% of the battery 8 to control the generator system utilizing a fuel cell. In order to execute the control in accordance with FIG. 5, the control program is previous stored in the memory 12A of the controller 12.

Figure 6:
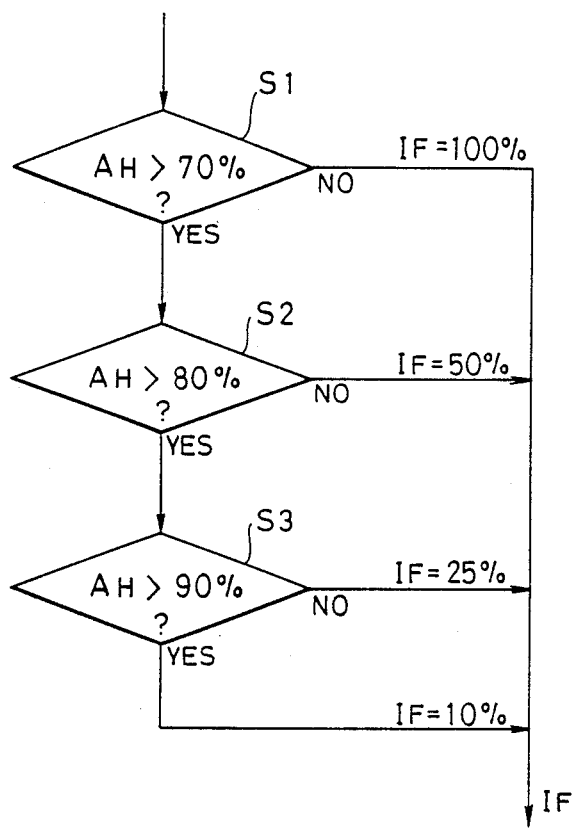
FIG. 6 is a flowchart illustrating an example of a control procedure by the controller.

FIG. 6 is a flowchart illustrating the steps carried out in response to the above-mentioned control program.

The value of the AH shown in FIG. 6 is a ratio in percent between the value of the current measured by the ampere-hour meter shown in FIG. 1 and the amount of the energy completely charged the battery 8. In the first step S1, it is detected whether or not AH is in excess of 70%. When the detected AH is 70% or less, the 100% fuel-cell-output-current command signal $I_F$ is delivered from the controller 12.

On the other hand, when AH is in excess of 70% in the first step S1, the step S2 is executed in order to detect whether or not AH is in excess of 80%. When the detected AH is less than 80%, the 50% fuel-cell-output-current command signal $I_F$ is delivered from the controller 12. On the other hand, when the detected AH is in excess of 80%, it is executed to detect whether or not AH is in excess of 90% in the third step S3. When the detected AH is 90% or less, the 25% fuel-cell-output-current command signal $I_F$ is delivered from the controller 12. On the other hand, the detected AH is in excess of 90%, the 10% fuel-cell-output-current command signal $I_F$ is delivered from the controller 12.

The reason why the fuel-cell-output-current command signal $I_F$ is not given by straight line downward to the right or does not decrease monotonically but decreases stepwise is that when the amount of the raw material to be supplied to the reformer 2 is maintained constant for at least within some range of charged energy, the stable operation of the reformer 2 can be ensured.

So far it has been described that the fuel-cell-output-current command signal $I_F$ is delivered to the DC/DC converter 15 and the controller for auxiliary devices 16. The reason is to adjust the output current supplied from the fuel cell 4 to the battery 8 and the load 9 by controlling the DC/DC converter 15, since the fuel cell 4 cannot follow the variations in energy stored in the battery 8.

As described above, according to the present invention, the output from the fuel cell is controlled in response to the energy stored in the battery so that the stable supply of the output to the load is ensured. Furthermore, in response to the increase of the load, the energy stored in the battery 8 is decreased as the battery discharges to the load. In this case, the control is executed so as to increase the output of the fuel cell so that the load on the battery is decreased. As a result, the life of the battery is extended.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A method for controlling a generator system having a fuel cell and a battery to which the output current from said fuel cell can be supplied, comprising the steps of:

performing a first adjustment of adjusting the output current delivered from said fuel cell;

performing the second adjustment of adjusting the output current produced in said fuel cell;

storing into a memory means a predetermined relationship between the charged amount of said battery and the control signal for controlling the output current from said fuel cell;

detecting the energy stored in said battery;

looking up said predetermined relationship in relation to the detected signal representative of the energy stored in said battery to form a control signal for controlling the output current from said fuel cell; and controlling said first and second adjustment in response to said control signal, so that the output current generated by said fuel cell is increased when the energy stored in said battery is decreased.

2. A method as claimed in claim 1, wherein said first adjustment step further includes a step for detecting the current delivered from said fuel cell.

3. A method as claimed in claim 2, wherein said current is detected by means of a Hall current transformer.

4. A method as claimed in claim 1, wherein said second adjustment step is executed by a controller for auxiliary devices.

5. A method as claimed in claim 4, wherein said controller for auxiliary devices comprises an arithmetic unit, a pulse-width modulator and power elements.

6. A method as claimed in claim 5, wherein said arithmetic unit comprises a function generator in the form of a CPU, an operational amplifier and one or more resistors.

7. A generator system having a fuel cell and a battery to which the output current from said fuel cell can be supplied, comprising:

a first adjustment means for adjusting the output current delivered from said fuel cell;

a second adjustment means for adjusting the output current generated in said fuel cell;

memory means for storing therein a predetermined relationship between the energy stored in said battery and a control signal for controlling the output current from said fuel cell;

a detector means for detecting the amount of energy stored in said battery;

means for looking up said predetermined relationship in relation to the detection signal representative of the energy stored in said battery to form a control signal for controlling the output current from said fuel cell; and a control means for controlling said first and second adjustment means in response to said control signal so that the output current delivered from said fuel cell is increased when the energy stored in said battery is decreased.

8. A generator system as claimed in claim 7, wherein said second adjustment means adjusts the volume of air discharged from an air blower for combustion for supplying air for combustion to said fuel cell.

9. A generator system as claimed in claim 7, wherein said second adjustment means is composed of a controller for auxiliary devices.

10. A generator system as claimed in claim 9, wherein said controller for auxiliary devices comprises an arithmetic unit, a pulse-width modulator and power elements.

11. A generator system as claimed in claim 10, wherein said arithmetic unit comprises a function generator in the form of a CPU, an operational amplifier and one or more resistors.

* * * * *